Patented Aug. 22, 1939

2,170,755

UNITED STATES PATENT OFFICE 2,170,755

METHOD OF MAKING RESIN-FIBER COMPOSITIONS

Norman D. Hanson, Bloomfield, N. J., assignor to Bakelite Corporation, New York, N. Y., a corporation of Delaware No Drawing. Application April 8, 1935, Serial No. 15,349

5 Claims. (Cl. 92—21)

The invention relates to resin-fiber compositions and to a process of producing the same, and particularly to a quick-curing composition comprising fibrous material and heat-hardenable phenol-aldehyde condensation products of special value in molding articles under heat and pressure.

A principal object of the invention is the production of resin-fiber compositions which will be quick-curing and sufficiently free-flowing to fill the various type molds used in hot pressure molding. This and other advantages are obtained by the method of the invention which broadly comprises treating a mixture of a fibrous material and a well-advanced phenol-aldehyde resin, advantageously in sheet form, with a free-flowing, quick-curing phenol-aldehyde resin. In this way, for example, quick-curing products of substantial resin content may be obtained with the use of only a relatively small amount of highly reactive resin, yet equivalent in speed to the curing cycle of the more reactive resin and by the use of such low cost slowly reactive resin in major portion of the bond, thereby decreasing the cost of manufacture and avoiding disadvantages arising in the molding of compositions containing large amounts of free-flowing highly reactive resinous materials. The invention also makes it possible to mold articles of considerable thickness in a shorter period of time than has heretofore been thought possible, by providing a substantial portion of the resin content of the molding material in an already well-advanced stage of reaction and thus greatly reducing the disturbances caused by vapors like water and ammonia given off in the actual curing operation of the present commercial highly reactive and quick curing type of resinoids.

In practicing the invention, a fibrous material may be impregnated with a resin varnish or a liquid resin, or it may be admixed with the resin in dry powdered form or in a suspension or emulsion. The resin is either reacted to a high state of advancement before mixing with the fibrous materials, or the mixture of the fibrous material and resin is heated to cause the resin to be advanced to the gel point. The fibrous material may be in sheet form before mixture with the resin, or the resin-fiber mixture may be formed into sheets after it is made, for example, by admixing wet fibrous pulp with an aqueous suspension or emulsion of the resin in a paper mill beater or by mixing a dry pulp with a solution of the resin in a volatile solvent. The sheet, after drying, if necessary, is then coated or impregnated with a highly reactive resin and again dried, if desirable. The treated sheets may be formed into articles by heating under pressure, or the sheets may be fused between hot rolls and then ground to form a molding powder.

The following is an illustrative example of the invention:

A mixture of 100 parts of high-boiling coal tar phenols, 50% boiling above 212°, 80 parts of 37% formaldehyde solution, 3½ parts of 28% ammonium hydroxide solution and 75 parts of asphalt was refluxed together until a very stiff, slowly hardening type resin was produced. This resin was incorporated with kraft pulp and the mixture formed into sheets containing about 25% of resin and dried with heat, thus further advancing the resin. The sheet so formed would not bond under a heat pressure cycle of 150° C. and 2,000 lbs. per square inch.

A mixture of 100 parts of phenol, 100 parts of 37% formaldehyde solution and 0.7 part of oxalic acid was refluxed for two hours. Lime was added in a small excess over the amount required to neutralize the acid and the resin was dehydrated in a vacuum.

The sheets were then impregnated with about 15% of the latter resin in an alcoholic medium and dried at a low temperature to avoid undue changes in the flow characteristics of this rapid curing resinoid. Laminated articles ⅛ inch in thickness built up out of these sheets molded in two minutes and discharged hot from the mold without showing signs of delamination or blistering. When the sheets were passed through hot rolls and ground to a powder they produced a molding powder which discharged hot from the mold in two minutes' curing time without evidence of blistering.

Other phenols, such as resorcinol, meta-cresol or meta-xylenol, may be used in the production of the resins used in the invention. Resorcinol is of particular advantage in increasing the rate of cure of the highly reactive resin for the second resinous component.

Other aldehydes may be used in the place of formaldehyde, particularly in the production of the resin used as the first resinous component. For example, the reaction products of phenol, cresol, xylenol and the like with furfural are suitable for this purpose.

Accelerating agents, such as lime or hexamethylene tetramine, or plasticizing or other modifying agents, may be added to the compositions of the invention.

While the relative proportions of the well-advanced resin and the free-flowing, quick-curing resin in the hot molding compositions of the invention may be varied within wide limits, depending upon the specific resins, the fibrous material, the use to which the compositions are to be put, and other factors, it is in general advantageous to use from 15% to 40% of the well-advanced resin and from 5% to 25% of the free-flowing quick-curing resin.

I claim:

1. A method of making a quick-curing resin-fiber composition which comprises treating a sheeted mixture of a fibrous material and from 15 to 40% of a phenol-aldehyde resin reacted approximately to the gel point with from 5 to 25% of a free-flowing, quick-curing phenol-aldehyde resin.

2. A method of making a quick-curing resin-fiber composition which comprises mixing from 15 to 40% of a phenol-aldehyde resin reacted approximately to the gel point with a fibrous material, forming the mixture into sheets and treating the sheeted mixture with from 5 to 25% of a free-flowing, quick-curing phenol-aldehyde resin.

3. A method of making a quick-curing resin-fiber composition which comprises mixing from 15 to 40% of a slow-curing phenol-aldehyde resin reacted approximately to the gel point with a fibrous material, forming the mixture into sheets and treating the sheeted mixture with from 5 to 25% of a free-flowing, quick-curing phenol-aldehyde resin.

4. A method of making a quick-curing resin-fiber composition which comprises mixing a fibrous material with from 15 to 40% of a phenol-aldehyde resin, forming the mixture into sheets, reacting the resin approximately to the gel point, and treating the sheeted mixture with from 5 to 25% of a free-flowing, quick-curing phenol-aldehyde resin.

5. A method of making a quick-curing resin-fiber composition which comprises mixing a fibrous material with from 15 to 40% of a slow-curing phenol-aldehyde resin, forming the mixture into sheets, reacting the resin approximately to the gel point, and treating the sheeted mixture with from 5 to 25% of a free-flowing, quick-curing phenol-aldehyde resin.

NORMAN D. HANSON.